US008675227B2

(12) United States Patent
Fukasawa (10) Patent No.: US 8,675,227 B2
(45) Date of Patent: Mar. 18, 2014

(54) IMAGE FORMING APPARATUS INCLUDING A SERVICE PROVIDER FOR USING AN EXTERNAL SERVER, AND A CORRESPONDING INFORMATION PROCESSING SYSTEM, CONTROL METHOD AND COMPUTER-READABLE MEDIUM

(75) Inventor: Yusuke Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 12/945,188

(22) Filed: Nov. 12, 2010

(65) Prior Publication Data

US 2011/0157629 A1 Jun. 30, 2011

(30) Foreign Application Priority Data

Dec. 28, 2009 (JP) ................................ 2009-298824

(51) Int. Cl.
*G06F 3/12* (2006.01)
(52) U.S. Cl.
USPC ............ 358/1.15; 358/1.16; 358/1.1; 726/26; 726/27; 726/28; 726/29; 726/30; 705/51; 705/52; 705/59; 713/150; 718/104
(58) Field of Classification Search
None
See application file for complete search history.

(56) References Cited

U.S. PATENT DOCUMENTS

| 8,539,595 B2 * | 9/2013 | Tsuboi | 726/26 |
| 2004/0133448 A1 * | 7/2004 | Higashi et al. | 705/1 |
| 2004/0249762 A1 * | 12/2004 | Garibay et al. | 705/59 |
| 2005/0049973 A1 * | 3/2005 | Read et al. | 705/59 |
| 2006/0106727 A1 * | 5/2006 | Yellai et al. | 705/59 |
| 2006/0184932 A1 * | 8/2006 | Burnley et al. | 717/174 |
| 2006/0294019 A1 * | 12/2006 | Dayan et al. | 705/59 |
| 2008/0209569 A1 * | 8/2008 | Araki | 726/26 |
| 2009/0024984 A1 * | 1/2009 | Maeda | 717/121 |
| 2009/0122356 A1 * | 5/2009 | Mihira | 358/402 |
| 2009/0231612 A1 * | 9/2009 | Matsushita | 358/1.15 |
| 2009/0235363 A1 * | 9/2009 | Tomita | 726/27 |
| 2009/0323107 A1 * | 12/2009 | Maeda | 358/1.15 |
| 2010/0011369 A1 | 1/2010 | Uchida | |
| 2010/0023758 A1 * | 1/2010 | Han et al. | 713/156 |
| 2010/0057674 A1 * | 3/2010 | O'Donnell | 707/3 |
| 2011/0061102 A1 * | 3/2011 | Aono et al. | 726/21 |
| 2011/0162079 A1 * | 6/2011 | Amimoto | 726/26 |

FOREIGN PATENT DOCUMENTS

JP 2009026015 A1 2/2009

* cited by examiner

*Primary Examiner* — Hilina K Demeter
(74) *Attorney, Agent, or Firm* — Fitzpatrick, Cella, Harper & Scinto (57) ABSTRACT

A system comprises a plurality of image forming apparatuses, wherein a first image forming apparatus includes: a correspondence determination unit that determines which function in the first image forming apparatus the service provider of the first image forming apparatus corresponds to; a provider determination unit that determines a second image forming apparatus in the plurality of image forming apparatuses that includes the same service provider as the service provider of the first image forming apparatus; a license verification unit that verifies whether license information is assigned to the service provider of the second image forming apparatus determined by the provider determination unit; and an assignment unit that assigns, to the second image forming apparatus to which the license information is not assigned, license information of the service provider from the first image forming apparatus to the second image forming apparatus and server relation information that is information for accessing a server.

11 Claims, 7 Drawing Sheets

```
LIST OF MFPS TO WHICH A LICENSE
       CAN BE ASSIGNED

┌─────────────────────────────────┐
│ MFP2                            │
└─────────────────────────────────┘

MFP4

```
LIST OF MFPS CAPABLE OF USING
  THE SAME SERVICE PROVIDER

MFP3

MFP5

```
   CURRENTLY ASSIGNING LICENSE
          TO MFP 2 · · ·
```

FIG. 7B

IMAGE FORMING APPARATUS INCLUDING A SERVICE PROVIDER FOR USING AN EXTERNAL SERVER, AND A CORRESPONDING INFORMATION PROCESSING SYSTEM, CONTROL METHOD AND COMPUTER-READABLE MEDIUM

BACKGROUND OF THE INVENTION

1. Field of the Invention

The present invention relates to an image forming apparatus, an information processing system, a control method, and a computer-readable medium. The present invention particularly relates to a technique that enables an MFP, which is an example of an image forming apparatus, to temporarily use the same service as another MFP by assigning, to the MFP, information such as a license related to service execution in the other MFP.

2. Description of the Related Art

The following is an example of a conventional technique related to the execution of services such as scanning, printing, fax transmission, and so on in another MFP through the use of license assignment. A primary task processing apparatus that is capable of executing the most tasks (where "task" has the same meaning as "service") is detected on a network based on job flow data in which multiple tasks have been combined. Then, if there is a task processing function for which no license is present, a license is acquired from another MFP, and the tasks denoted in the job flow data are executed by the primary task processing apparatus (see Japanese Patent Laid-Open No. 2009-26015; called "Patent Document 1" hereinafter).

However, in Patent Document 1, task processes are carried out using only attribute information denoted in the job flow. Accordingly, there is a problem in that in the case where a task utilizes an external service such as a web server or the like, assignments regarding external service relation information held by the MFP service that is the source of the assignment, permission of the MFP to access the external service, and so on cannot be carried out.

SUMMARY OF THE INVENTION

According to one aspect of the present invention, there is provided an information processing system comprising a plurality of image forming apparatuses, each image forming apparatus including a service provider capable of using an external server in correspondence with a function of the image forming apparatus, wherein a first image forming apparatus includes: a correspondence determination unit that determines which function in the first image forming apparatus the service provider of the first image forming apparatus corresponds to; a provider determination unit that determines a second image forming apparatus in the plurality of image forming apparatuses that includes the same service provider as the service provider of the first image forming apparatus; a license verification unit that verifies whether license information is assigned to the service provider of the second image forming apparatus determined by the provider determination unit; and an assignment unit that assigns, to the second image forming apparatus to which the license information is not assigned, license information of the service provider from the first image forming apparatus to the second image forming apparatus and server relation information that is information for accessing a server, wherein the assignment unit of the first image forming apparatus changes access permission to the server to which the first image forming apparatus can connect from the first image forming apparatus to the second image forming apparatus.

According to another aspect of the present invention, there is provided an image forming apparatus including a service provider capable of using an external server in correspondence with a function of the image forming apparatus, the image forming apparatus comprising: a correspondence determination unit that determines which function in the image forming apparatus the service provider of the image forming apparatus corresponds to; a provider determination unit that determines another image forming apparatus that includes the same service provider as the service provider of the image forming apparatus, from among other image forming apparatuses connected to the image forming apparatus; a license verification unit that verifies whether license information is assigned to the service provider of the other image forming apparatus determined by the provider determination unit; and an assignment unit that assigns, to the other image forming apparatus to which the license information is not assigned, license information of the service provider from the image forming apparatus to the other image forming apparatus and server relation information that is information for accessing a server, wherein the assignment unit changes access permission to the server to which the image forming apparatus can connect from the image forming apparatus to the other image forming apparatus.

According to another aspect of the present invention, there is provided a control method for an image forming apparatus including a service provider capable of using an external server in correspondence with a function of the image forming apparatus, the method comprising: a correspondence determination unit of the image forming apparatus determining which function in the image forming apparatus the service provider of the image forming apparatus corresponds to; a provider determination unit of the image forming apparatus determining another image forming apparatus that includes the same service provider as the service provider of the image forming apparatus, from among other image forming apparatuses connected to the image forming apparatus; a license verification unit of the image forming apparatus verifying whether license information is assigned to the service provider of the other image forming apparatus determined in the determining; and an assignment unit of the image forming apparatus assigning, to the other image forming apparatus to which the license information is not assigned, license information of the service provider from the image forming apparatus to the other image forming apparatus and server relation information that is information for accessing a server, wherein in the assigning, access permission to the server to which the image forming apparatus can connect is changed from the image forming apparatus to the other image forming apparatus.

According to another aspect of the present invention, there is provided a computer-readable medium in which is stored a program that, when executed by a computer, causes the computer to function as: a correspondence determination unit that determines which function in the computer a service provider that is capable of using an external server in correspondence with a function of the computer corresponds to; a provider determination unit that determines another computer that includes the same service provider as the service provider of the computer, from among other computers connected to the computer; a license verification unit that verifies whether license information is assigned to the service provider of the other computer determined by the provider determination unit; and an assignment unit that assigns, to the other computer to which the license information is not assigned, license information of the service provider from the computer to the other computer and server relation information that is information for accessing a server, wherein the assignment unit changes access permission to the server to which the computer can connect from the computer to the other computer.

Even in the case where an MFP service cannot be used temporarily, another MFP is assigned a license for the service, external server relation information, and access permission to an external server. Through this, another MFP can use the same services during the period where the MFP that could not be used temporarily is recovering.

Further features of the present invention will become apparent from the following description of exemplary embodiments (with reference to the attached drawings).

DESCRIPTION OF THE EMBODIMENTS

Hereinafter, an embodiment of the present invention will be described in detail with reference to the drawings. It should be noted that the invention according to the scope of claims is not intended to be limited to the embodiment described hereinafter, and all combinations of the features described in the following embodiment are not necessarily required to achieve the present invention.

(System Configuration)

Figure 1:
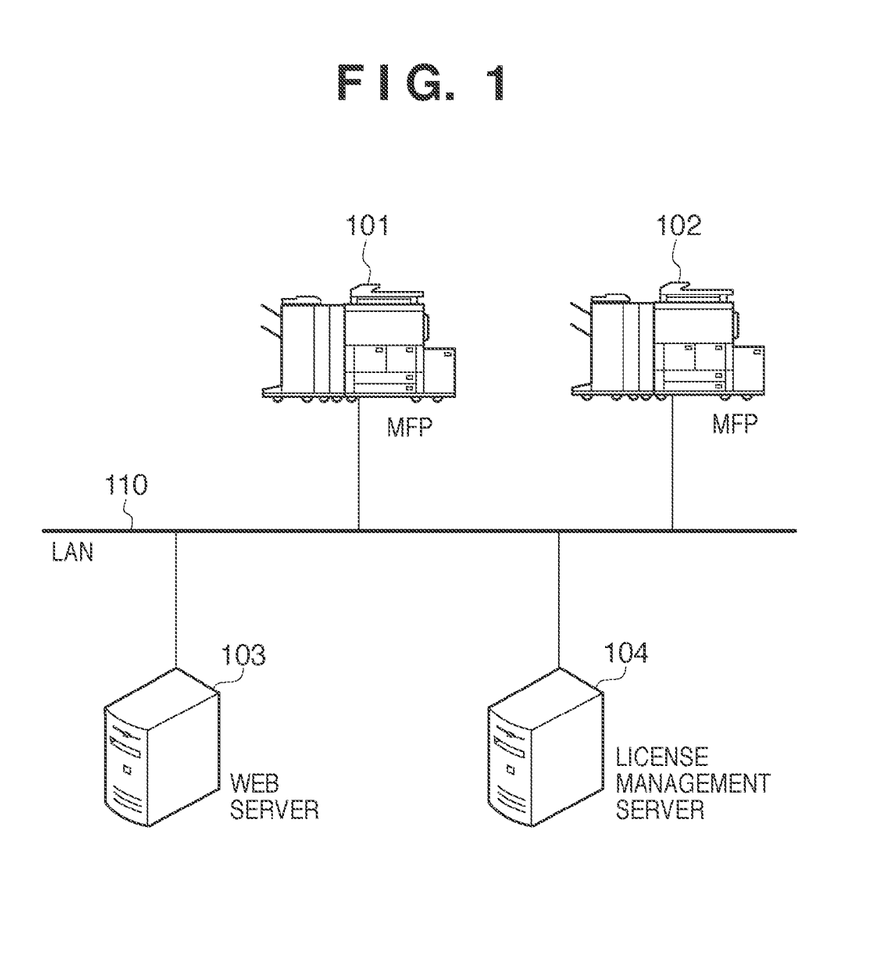
FIG. 1 is an overview of an information processing system according to an embodiment of the present invention.

FIG. 1 is an overview of an exemplary information processing system according to the present invention. MFPs 101 and 102, a web server 103, and a license management server 104 are connected to a LAN 110. It should be noted that the internal hardware and software configurations of the MFPs 101 and 102, which serve as image forming apparatuses, are identical. Furthermore, although two MFPs are connected to the LAN 110 here, the present invention is not limited thereto, and any number of MFPs may be connected as long as there are more than one MFP. Further still, although the external server used by the service providers is described as a web server in the present embodiment, the present invention is not limited thereto, and the external server may be changed in accordance with the functions of the MFPs.

Figure 2:
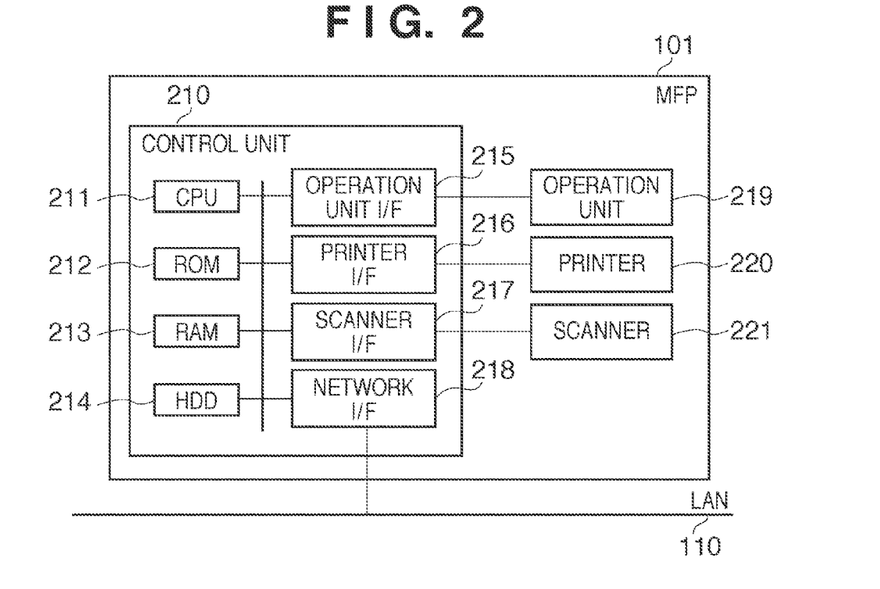
FIG. 2 is a block diagram illustrating the configuration of an MFP according to an embodiment of the present invention.

FIG. 2 is a block diagram illustrating the configuration of the MFP 101. A control unit 210 that includes a CPU 211 controls the operations of the MFP 101 as a whole. The CPU 211 reads out control programs stored in a ROM 212 and executes various types of control processes, such as reading control, transmission control, and so on. A RAM 213 is used as the main memory of the CPU 211, a temporary storage region such as a work area, or the like. An HDD 214 stores image data, various types of programs, or various types of information tables, which will be described later. An operation unit I/F 215 connects an operation unit 219 to the control unit 210. The operation unit 219 includes, for example, a liquid crystal display unit having a touch panel function, a keyboard, or the like. In addition, the MFP 101 is provided with a web browser function, which will be described later; the web browser of the MFP 101 analyzes HTML files received from the web server 103, and displays operation screens based on what is written in the received HTML files in the operation unit 219. A printer I/F 216 connects a printer 220 to the control unit 210. Image data that is to be printed by the printer 220 is transferred to the printer 220 from the control unit 210 via the printer I/F 216, and is printed onto a recording medium by the printer 220. A scanner I/F 217 connects a scanner 221 to the control unit 210. The scanner 221 reads an image on a document and generates image data therefrom, and inputs the generated image data into the control unit 210 via the scanner I/F 217. A network I/F 218 connects the control unit 210 (and furthermore, the MFP 101) to the LAN 110. The network I/F 218 transmits image data, information, and so on to an external device located on the LAN 110 (for example, the web server 103), receives various types of information from the external device located on the LAN 110, and so on.

Figure 3:
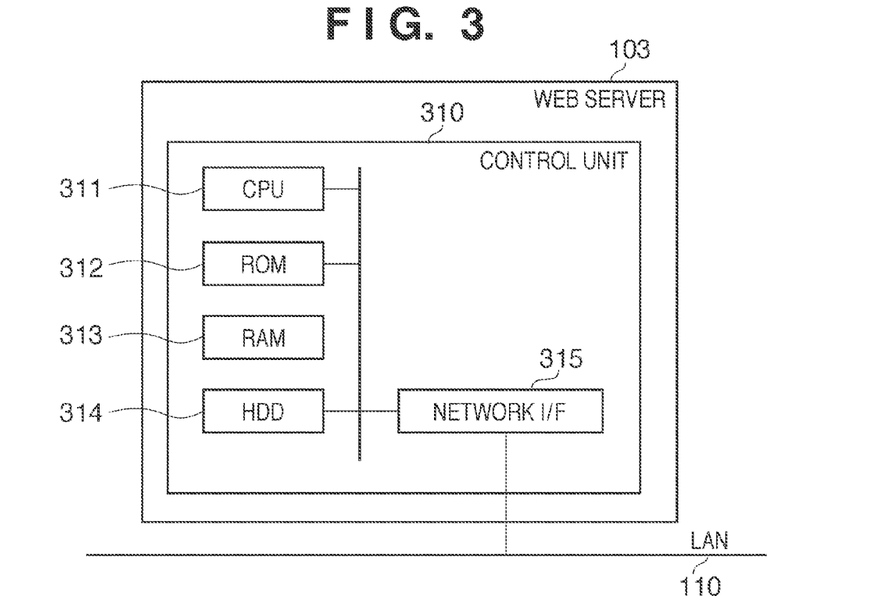
FIG. 3 is a block diagram illustrating the configuration of a web server according to an embodiment of the present invention.

FIG. 3 is a block diagram illustrating the configuration of the web server 103. A control unit 310 that includes a CPU 311 controls operations of the web server 103 as a whole. The CPU 311 reads out control programs stored in a ROM 312 and executes various types of control processes. A RAM 313 is used as the main memory of the CPU 311, a temporary storage region such as a work area, or the like. An HDD 314 stores image data, various types of programs, or various types of information tables. A network I/F 315 connects the control unit 310 (and furthermore, the web server 103) to the LAN 110. The network I/F 315 exchanges various types of information with other apparatuses located on the LAN 110.

Figure 4:
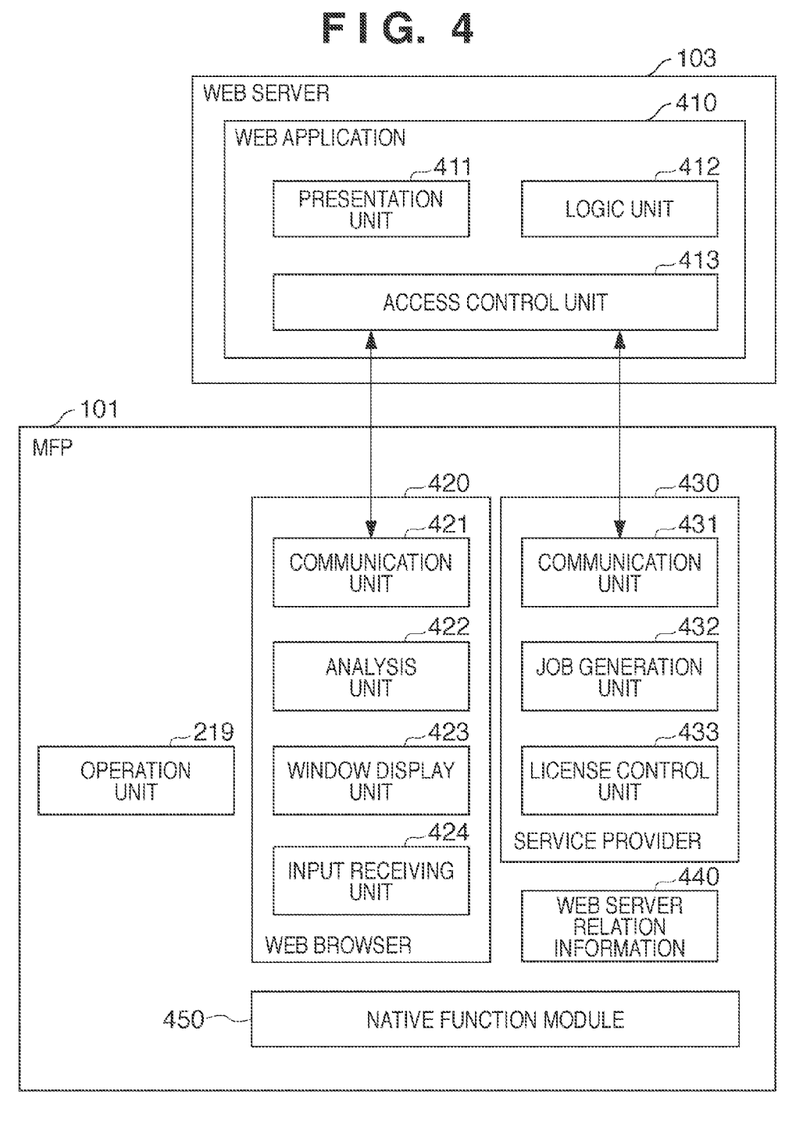
FIG. 4 is a diagram illustrating the overall software configuration of an information processing system according to an embodiment of the present invention.

FIG. 4 is a diagram illustrating the overall software configuration of the information processing system. The various functional units illustrated in FIG. 4 are realized by the CPUs provided in the MFP 101 and the web server 103 executing control programs stored in the respective storage regions, such as the RAMs, the HDDs, or the like. The MFP 101 includes a web browser 420, a service provider 430, web server relation information 440, a native function module 450, and the operation unit 219. The native function module 450 includes various types of native applications provided not by the web server 103 but provided based on programs held within the MFP 101. This includes, for example, applications that execute a printing process performed by the printer 220 of the MFP 101, a reading process performed by the scanner 221, or a transmission process executed via the network I/F 218. In addition, modules that carry out processes for configuring the MFP 101 as a whole, switching applications, and so on are included in the native function module 450.

The web browser 420 includes a communication unit 421, an analysis unit 422, a window display unit 423, and an input receiving unit 424. The communication unit 421 communicates with a presentation unit 411 via an access control unit 413 of a web application 410 in accordance with the HTTP protocol. To be more specific, the communication unit 421 makes a request to the web application 410 for an operation window to be displayed in the web browser 420, and communicates instructions from a user that have been inputted via the operation window displayed in the web browser 420 to the web application 410. The analysis unit 422 analyzes HTML files received from the web application 410. These HTML files include descriptions indicating the content of operation windows to be displayed in the web browser 420. The window display unit 423 displays the operation window in the operation unit 219 based on the results of the analysis performed by the analysis unit 422. A window displayed based on information received from the web server 103 (HTML files or the like) in this manner is called a "web browser window". The input receiving unit 424 receives input instructions through the web browser window displayed in the operation unit 219. The input information is transmitted to the web application 410 via the communication unit 421.

The web server 103 includes the web application 410. Furthermore, the web application 410 includes the presentation unit 411, a logic unit 412, and the access control unit 413. The presentation unit 411 communicates with the communication unit 421, transmitting the operation window that is to be displayed in the web browser 420 of the MFP 101 to the MFP 101 in response to a request from the MFP 101. In addition, the presentation unit 411 receives, from the MFP 101, instructions from a user inputted via the operation window displayed in the web browser 420 of the MFP 101. Having received instructions from the user, the web application 410 executes various processes in accordance with the content of the instructions. In addition, the web application 410 requests the MFP 101 to execute processes depending on the content of the instructions. To be more specific, the web application 410 requests the execution of a printing process performed by the printer 220 of the MFP 101, a reading process performed by the scanner 221, or a transmission process executed via the network I/F 218.

In the case where the MFP 101 is requested to execute a process in this manner, the logic unit 412 communicates with a communication unit 431 within the service provider 430 included in the MFP 101. The service provider 430 includes the communication unit 431, a job generation unit 432, and a license control unit 433. The communication unit 431 receives a processing request from the logic unit 412 within the web application 410. In the case where the web application 410 has requested a process to be executed, the job generation unit 432 generates and executes a job for executing the requested process. The license control unit 433 carries out processes necessary when assigning and returning licenses. Details of this will be described using FIG. 5. The web server relation information 440 is information, managed by the HDD 214 of the control unit 210, for communicating with the web server, and is, for example, a URL, a cookie, an address book for making fax transmissions, or the like. The information contained in the web server relation information 440 is not limited to the examples given here, and may include other information in accordance with the services provided by the web server 103 and the service provider 430. Meanwhile, the external server is a web server in the present embodiment, and thus the server relation information is called "web server relation information" for the sake of convenience.

Figure 5:
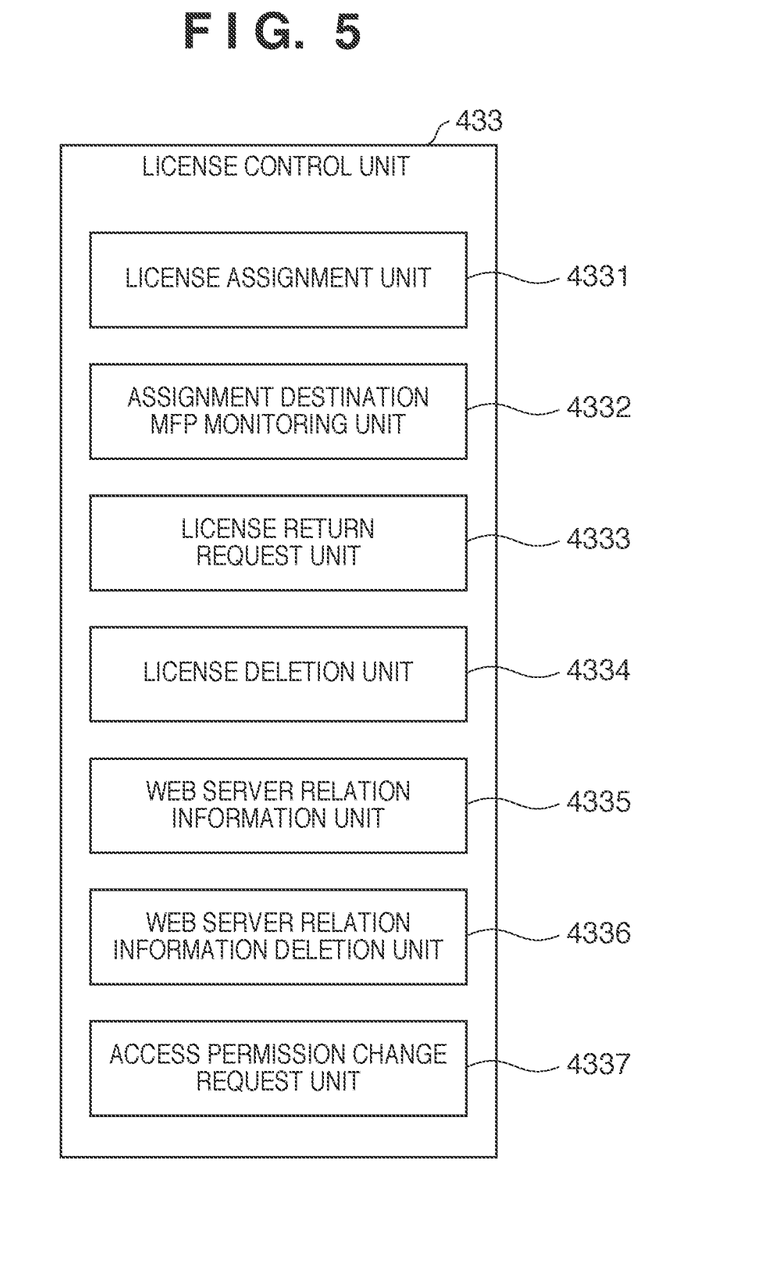
FIG. 5 is a diagram illustrating a license control unit within a service provider according to an embodiment of the present invention.

FIG. 5 is a diagram illustrating the license control unit 433 within the service provider 430. The license control unit 433 includes a license assignment unit 4331, an assignment destination MFP monitoring unit 4332, a license return request unit 4333, a license deletion unit 4334, a web server relation information assignment unit 4335, a web server relation information deletion unit 4336, and an access permission change request unit 4337. The license assignment unit 4331 makes a notification to the license management server 104 in order to assign a license to the other MFP 102 when a license assignment request has been received from the MFP 101 via the web application 410. The assignment destination MFP monitoring unit 4332 monitors whether or not the service provider 430 of the MFP 102 is in use when the service provider 430 of the MFP 102 is capable of being used after the assignment of the license. The license return request unit 4333 makes a notification to the license management server 104 in order to return the license from the MFP 102 when the MFP 101 requires a license after the assignment. The license deletion unit 4334 assigns the license from the MFP 101 to the MFP 102 and deletes the license from the assignment destination, which is the MFP 102. The web server relation information assignment unit 4335 transmits the web server relation information 440 to the MFP 102 and saves the web server relation information 440 of the MFP 102 when a license assignment request has been received from the MFP 101 via the web application 410. The web server relation information deletion unit 4336 deletes the web server relation information 440 from the MFP 102 that has received the license return request from the MFP 101. The access permission change request unit 4337 transmits, from the MFP 101 to the access control unit 413, an instruction that assigns the permission of access to the MFP 102, when a license assignment request has been received from the MFP 101 via the web application 410. The access permission change request unit 4337 also transmits, from the MFP 101 to the access control unit 413, an instruction to delete the permission to access the MFP 102, when a license has been returned to the MFP 101. Note that in the present specification, information regarding a license is referred to simply as a "license" or as "license information".

Window Display Examples

Figure 6A:
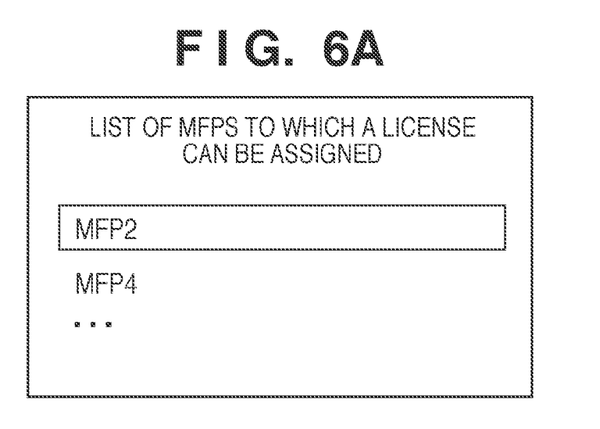
FIGS. 6A, 6B, and 6C are diagrams illustrating examples of a user interface window according to an embodiment of the present invention.
Figure 6B:
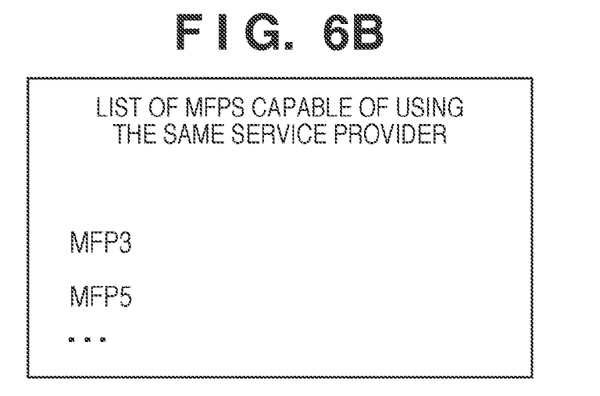
Figure 6C:
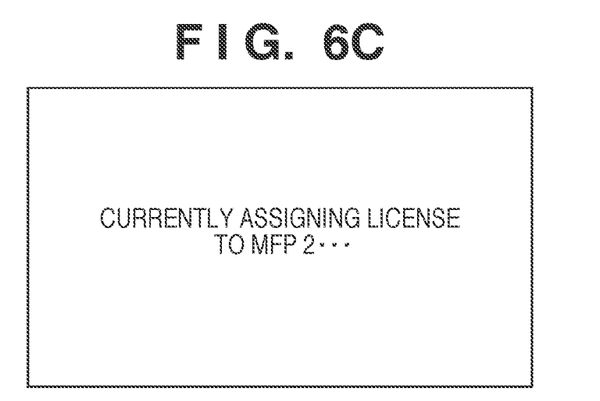

FIG. 6A is a diagram illustrating a list of MFPs in which service providers 430 to which licenses have not been assigned are installed, the list being displayed in the operation unit 219. This diagram corresponds to the process of S110 in the flowcharts illustrated in FIGS. 7A and 7B, described later. FIG. 6B is a diagram illustrating information of MFPs in which service providers 430 to which licenses are assigned are installed, the information being displayed in the operation unit 219. This diagram corresponds to the process of S111 in the flowcharts illustrated in FIGS. 7A and 7B, described later. FIG. 6C is a diagram illustrating information of the assignment destination MFP 102 displayed in the operation unit 219 in a usage window of the service provider 430 of the MFP 101. This diagram corresponds to the process of S115 in the flowcharts illustrated in FIGS. 7A and 7B, described later.

Processing Flow

Figure 7A:
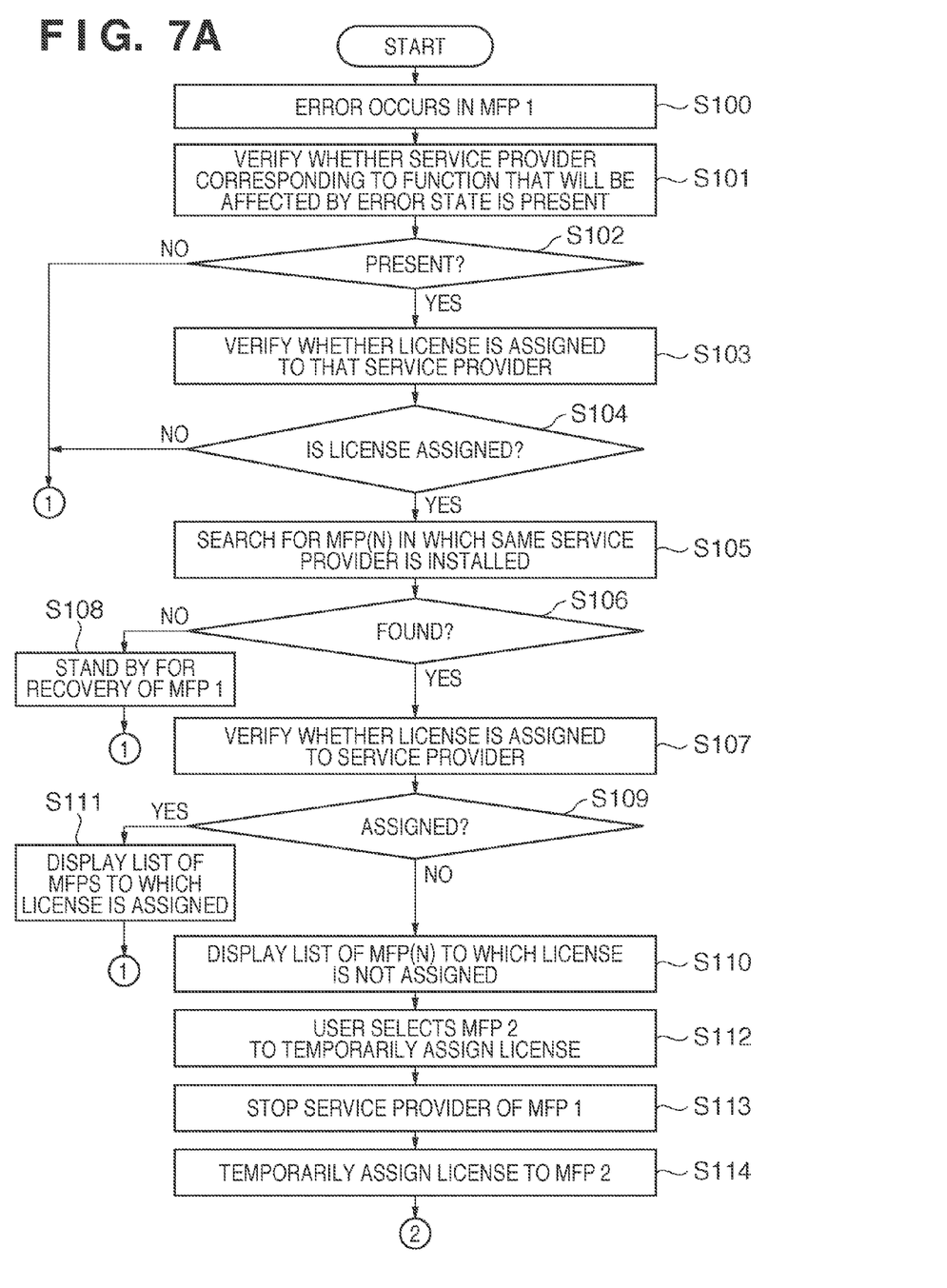
FIGS. 7A and 7B are flowcharts illustrating an overall process according to an embodiment of the present invention.
Figure 7B:
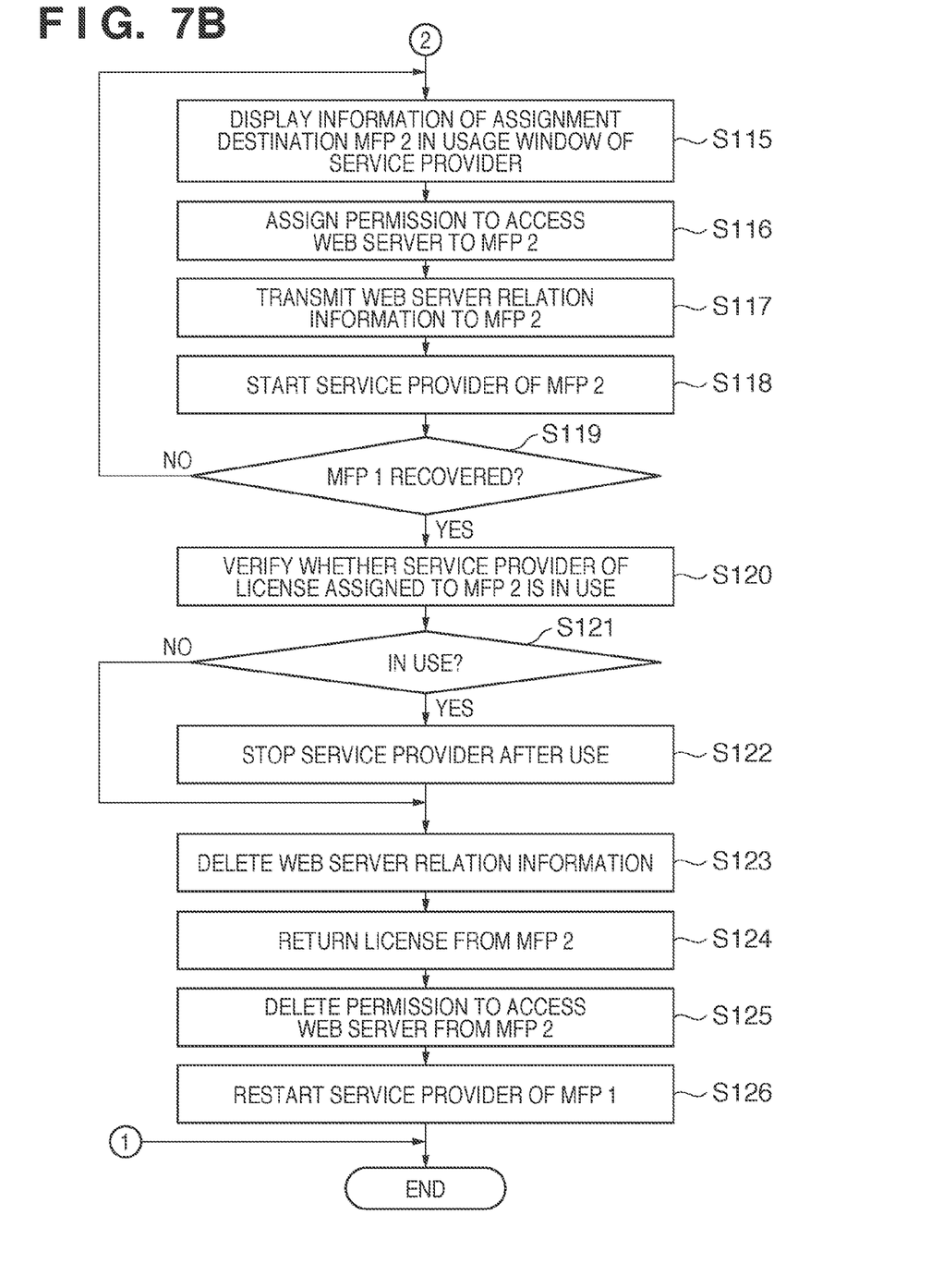

FIGS. 7A and 7B are flowcharts illustrating the overall processing flow according to the present invention. An outline of the processing is as follows. When an error occurs in the MFP 101 (called an "MFP 1" hereinafter) and the service provider 430 cannot be used, the assignment of a license, the transmission of the web server relation information 440, and the assignment of permission to access the web server are carried out for the MFP 102 (called an "MFP 2" hereinafter). Through this, the MFP 2 is temporarily capable of using the functions of the service provider 430. Meanwhile, when error recovery has been completed in the MFP 1, the return of the license from the MFP 2, the deletion of the web server relation information 440 in the MFP 2, and the deletion of the permission to access the web server from the MFP 2 are carried out. This will be described in detail hereinafter using FIGS. 7A and 7B. Note that the MFP 1 corresponds to a first image forming apparatus and the MFP 2 corresponds to a second image forming apparatus.

S100 in FIG. 7A illustrates a state in which the MFP 1 is in an unusable state due to a scanner jam, a fax transmission malfunction, or the like. In S101, is verified whether or not the service provider 430 that corresponds to a function that is affected by the error that occurred in S100 is present in the MFP 1. In other words, it is verified whether a service provider that corresponds to a function that is no longer capable of using a service due to the error is present. In the case where it has been verified in S101 that such a service provider 430 is present in S102, the process advances to S103. However, in the case where this has not been verified in S101, there is no MFP to which a license is to be assigned, and thus the process ends. This realizes a correspondence determination unit. In S103, in the case where such a service provider 430 is present, it is verified whether a license is assigned to the service provider in the MFP 1. In S104, if a license is assigned to the service provider 430, the process advances to S105. However, in the case where a license is not assigned, a license cannot be assigned from the MFP 1 to another MFP, and thus the process ends.

In S105, an MFP that is connected to the LAN 110 and in which the same service provider 430 is installed, is searched for. In S106, in the case where one or more MFPs have been found as a result of the MFP search, the process advances to S107. In the case where no such MFP has been found, in the process of S108, the system stands by for the error recovery of the MFP 1 to complete in order to use a function of the service provider 430 of the MFP 1. After that, the processing flow ends. This realizes a provider determination unit. In S107, it is verified whether a license for the service provider 430 is assigned in the MFPs found as a result of the search performed in S105. In the case where even a single license for the service provider 430 of the MFPs is found to be assigned as a result of the search carried out in S109, information of the MFPs in which the service provider 430 that is assigned a license is installed is displayed in the operation unit 219, as shown in FIG. 6B, through the processing performed in S111. This prompts the user to use those MFPs. The MFPs displayed here are capable of using the service of the service provider 430 belonging to the MFP 1 in which the error has occurred, even if the license of that provider is not assigned. In the case where absolutely no licenses are assigned, the process advances to S110. This realizes a license verification unit.

In S110, a list of MFPs to which licenses are not assigned is displayed in the operation unit 219, as shown in FIG. 6B. The MFPs displayed here are capable of being assigned the license of the service provider 430 belonging to the MFP 1 in which the error has occurred. In S112, the user selects, for example, the MFP 2 to which the license is to be temporarily assigned, the selection being carried out through the operation unit 219. In S113, the service provider 430 of the MFP 1 is stopped by processing performed by the license assignment unit 4331 of the MFP 1. In S114, the license is temporarily assigned to the MFP 2 by processing performed by the license assignment unit 4331 of the MFP 1. In S115, the information of the license assignment destination MFP 2 is displayed in the usage window of the service provider 430 of the MFP 1, as shown in FIG. 6C, by processing performed by the license assignment unit 4331 of the MFP 1. In S116, permission to access the web server 103 to which the MFP 1 can connect is assigned to the MFP 2 by processing performed by the access permission change request unit 4337 of the MFP 1. In S117, the web server relation information 440 of the web server to which the MFP 1 can connect is transmitted to the MFP 2 by processing performed by the web server relation information assignment unit 4335 of the MFP 1. In S118, processing performed by the license assignment unit 4331 of the MFP 2 starts the service provider 430 of the MFP 2.

In S119, in the case where the error recovery of the MFP 1 is complete and the service provider 430 has entered a usable state, the processing advances to S120. However, in the case where the error recovery is not complete, the processing of S115 is carried out, and the information of the assignment destination MFP 2 is displayed in the usage window of the service provider. At this time, the processes of S116, S117, and S118 are omitted. In S120, the usage state of the service provider 430 in the MFP 2 that is the assignment destination is verified in order to stop that service provider before returning the license. In other words, whether or not the service provider 430 corresponding to the license that was assigned to the MFP 2 is being used is verified by processing performed by the assignment destination MFP monitoring unit 4332 of the MFP 1. In S121, in the case where the service provider 430 corresponding to the license that was assigned to the MFP 2 is in use, the process advances to S122. However, in the case where the service provider 430 is not in use, the process advances to S123. In S122, the service provider 430 of the MFP 2 is stopped following the usage thereof by processing performed by the license assignment unit 4331 of the MFP 2. In S123, the web server relation information 440 is deleted by processing performed by the web server relation information deletion unit 4336 of the MFP 2. In S124, the license is returned from the MFP 2 via the license return request unit 4333 of the MFP 1. Furthermore, when the license is returned, the license is deleted using the license deletion unit 4334 of the MFP 2. In S125, the permission to access the web server 103 to which the MFP 2 can connect is deleted using the access permission change request unit 4337 of the MFP 2. In S126, the service provider 430 of the MFP 1 is once again made usable by restarting the service provider 430 of the MFP 1. This processing flow ends thereafter.

Accordingly, in the case where an MFP service cannot be used temporarily, another MFP is assigned a license for the service, external service related information, and access permission to an external server. Through this, the same services can be used by the other MFP during the period where the MFP that could not be used temporarily is being restored, even if the function to be used is a function that uses an external web server.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298824, filed Dec. 28, 2009, which is hereby incorporated by reference herein in its entirety.

What is claimed is:

1. An information processing system comprising a plurality of image forming apparatuses, each image forming apparatus including a service provider capable of using an external server in correspondence with a function of the image forming apparatus,
wherein a first image forming apparatus includes:
a correspondence determination unit that determines which function in the first image forming apparatus the service provider of the first image forming apparatus corresponds to;
a provider determination unit that determines a second image forming apparatus in the plurality of image forming apparatuses that includes the same service provider as the service provider of the first image forming apparatus;
a license verification unit that verifies whether license information is assigned to the service provider of the second image forming apparatus determined by the provider determination unit; and
an assignment unit that assigns, to the second image forming apparatus to which the license information is not assigned, license information of the service provider from the first image forming apparatus to the second image forming apparatus and server relation information that is information for accessing a server,
wherein the assignment unit of the first image forming apparatus changes access permission to the server to which the first image forming apparatus can connect from the first image forming apparatus to the second image forming apparatus.

2. The information processing system according to claim 1, wherein the second image forming apparatus includes a return unit that returns, to the first image forming apparatus, the license information assigned by the assignment unit of the first image forming apparatus, and deletes the server relation information.

3. The information processing system according to claim 2, wherein the return unit of the second image forming apparatus further verifies the usage state of the service provider in the second image forming apparatus when returning the license information to the first image forming apparatus.

4. The information processing system according to claim 2, wherein in the case where the service provider in the second image forming apparatus is in use, the return unit of the second image forming apparatus further returns the license information to the first image forming apparatus when the service provider is no longer in use.

5. The information processing system according to claim 2, wherein the return unit of the second image forming apparatus further stops the use of the service provider in the second image forming apparatus prior to returning the license information.

6. The information processing system according to claim 2, wherein when returning the license information, the return unit of the second image forming apparatus further deletes the access permission, changed by the assignment unit, that allows the second image forming apparatus to connect to the server.

7. The information processing system according to claim 2,
wherein the return unit of the second image forming apparatus further returns the license information from the second image forming apparatus to the first image forming apparatus; and
the first image forming apparatus once again makes the service provider usable using the returned license information.

8. An image forming apparatus including a service provider capable of using an external server in correspondence with a function of the image forming apparatus, the image forming apparatus comprising:
a correspondence determination unit that determines which function in the image forming apparatus the service provider of the image forming apparatus corresponds to;
a provider determination unit that determines another image forming apparatus that includes the same service provider as the service provider of the image forming apparatus, from among other image forming apparatuses connected to the image forming apparatus;
a license verification unit that verifies whether license information is assigned to the service provider of the other image forming apparatus determined by the provider determination unit; and
an assignment unit that assigns, to the other image forming apparatus to which the license information is not assigned, license information of the service provider from the image forming apparatus to the other image forming apparatus and server relation information that is information for accessing a server,
wherein the assignment unit changes access permission to the server to which the image forming apparatus can connect from the image forming apparatus to the other image forming apparatus.

9. The image forming apparatus according to claim 8, further comprising a return unit that returns, to the other image forming apparatus, the license information assigned by the assignment unit of the other image forming apparatus, and deletes the server relation information.

10. A control method for an image forming apparatus including a service provider capable of using an external server in correspondence with a function of the image forming apparatus, the method comprising:
a correspondence determination unit of the image forming apparatus determining which function in the image forming apparatus the service provider of the image forming apparatus corresponds to;
a provider determination unit of the image forming apparatus determining another image forming apparatus that includes the same service provider as the service provider of the image forming apparatus, from among other image forming apparatuses connected to the image forming apparatus;
a license verification unit of the image forming apparatus verifying whether license information is assigned to the service provider of the other image forming apparatus determined in the determining; and
an assignment unit of the image forming apparatus assigning, to the other image forming apparatus to which the license information is not assigned, license information of the service provider from the image forming apparatus to the other image forming apparatus and server relation information that is information for accessing a server,
wherein in the assigning, access permission to the server to which the image forming apparatus can connect is changed from the image forming apparatus to the other image forming apparatus.

11. A non-transitory computer-readable medium in which is stored a program that, when executed by a computer, causes the computer to function as:
a correspondence determination unit that determines which function in the computer a service provider that is capable of using an external server in correspondence with a function of the computer corresponds to;

a provider determination unit that determines another computer that includes the same service provider as the service provider of the computer, from among other computers connected to the computer;

a license verification unit that verifies whether license information is assigned to the service provider of the other computer determined by the provider determination unit; and an assignment unit that assigns, to the other computer to which the license information is not assigned, license information of the service provider from the computer to the other computer and server relation information that is information for accessing a server, wherein the assignment unit changes access permission to the server to which the computer can connect from the computer to the other computer.

* * * * *